I. N. HAGUE.
FRUIT BOX.
APPLICATION FILED NOV. 10, 1908.
924,982.
Patented June 15, 1909.
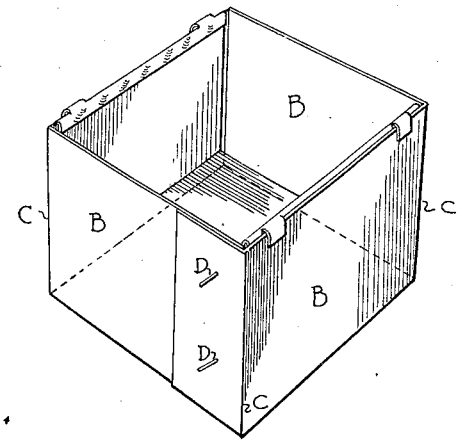
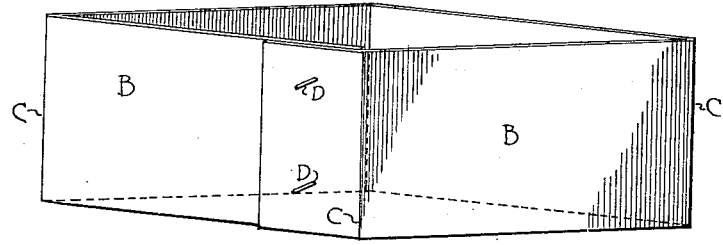
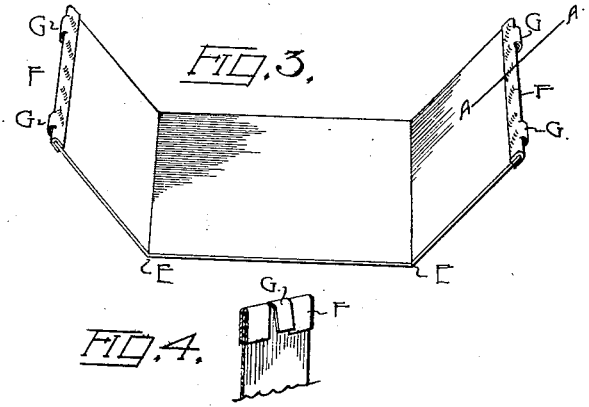
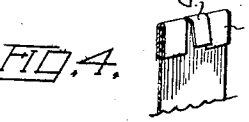
WITNESS:
M. A. Van House.
E. F. Mock.
Isaac N. Hague, INVENTOR
BY G. W. Bullard
ATTORNEY

UNITED STATES PATENT OFFICE.

ISAAC N. HAGUE, OF TACOMA, WASHINGTON.

FRUIT-BOX.

No. 924,982.     Specification of Letters Patent.     Patented June 15, 1909.

Application filed November 10, 1908. Serial No. 461,945.

*To all whom it may concern:*

Be it known that I, ISAAC N. HAGUE, a citizen of the United States, residing at the city of Tacoma, in the county of Pierce and State of Washington, have invented certain new and useful Improvements in Fruit-Boxes, of which the following is a specification.

My invention pertains to fruit boxes used in packing of berries and other small fruits for shipment and marketing.

The objects of my invention are; first, to manufacture fruit boxes that can be shipped from the factory in a flat knock-down form to the fruit grower, who can then set the boxes up and put them together as needed without the use of tools or staples; second, to produce a fruit box having a smooth bottom made of one piece of wood in which there are no joints or edges to cut and cause the fruit to bleed; and third, to produce metallic attachments whereby the bottom may be inserted and fastened within a fruit box without the use of staples. I attain these objects by means of the device illustrated in the accompanying drawings in which:—

Figure 1 is a view of my invention showing a fruit box made and set up with my improvement. Fig. 2 is a view of the box sides partly flattened showing how it may be packed flat for shipment from the factory. Fig. 3 is a similar view of the bottom piece of the box made with my improvement. Fig. 4 is an enlarged section A—A showing the form of the metallic attachment whereby the bottom is held in place without the use of staples.

Similar letters refer to similar parts in the several views.

In my invention the sides of the fruit box are made in the usual manner with one piece of thin box veneer B—B scored at the corners C—C so as to bend squarely, and bound together by means of the staples D—D, all of which is shown in Figs. 1 and 2. Heretofore the bottom has been attached to the sides of the box by means of staples or other methods that are more tedious in manufacture and cumbersome in packing. By my invention I secure a more simple and economical construction and require less space when packed in the knock-down form. The bottom is formed of one piece as shown in Fig. 3, the same being scored at E—E so as to bend up squarely at the ends to the top edges of the box sides. The upper edges of the folding end portions of the bottom member are provided with a metallic strip F covering the edge and substantially of the width of the end and side wall members. This strip is applied so that one side thereof will lie inside of the box and the other side will lie between the bent up end portion and the side wall member of the box thus stiffening and protecting both the bent up end portion and also the adjacent side wall member along their top edges. This makes an unusually strong box and gives to the side wall members and to the bent up end portions of the box rigidity and strength which is so desirable in boxes made of comparatively thin flexible material. The strip not only protects the edge of the bent up end portions but also protects the edge of the side wall members adjacent thereto throughout the width of both members as the strip extends parallel with the edges of both members. The outer sides of the strips are slitted so as to form clips G which will overlap the top edges of the adjacent side wall members and serve to hold the end members in engagement with the side wall members, said clips preferably being formed one near each end of the strip. The setting up of the box is done by hand, no tools or staples being required. The box is made complete at the factory and the fruit grower only has to set it up and put it together as described. The box thus constructed has a smooth bottom and interior free of edges that will bruise the fruit and cause it to bleed.

Having thus described my invention, what I claim as new and desire to secure by Letters Patent is:—

A box consisting of folding side wall members, and a separate bottom portion adapted to fit between the side wall members and having folding end members adapted to bear against the inner face of the side wall members, the upper ends of said end members being substantially the width of the side wall members against which they bear and provided along their top edges with metallic strips one side of which lies inside of the box and the other side between the end members and the adjacent side wall members so as to stiffen and protect the edges of both the end members and side wall members, said strips being formed with clips overlapping the side wall members, substantially as described.

In testimony whereof I affix my signature in presence of two witnesses.

ISAAC N. HAGUE.

Witnesses:
L. H. SPENCER,
H. P. PRATT.